United States Patent
Chen et al.

(10) Patent No.: US 8,229,415 B1
(45) Date of Patent: Jul. 24, 2012

(54) WIRELESS COMMUNICATION DATA STORE CONSTRUCTION AND ANALYSIS

(75) Inventors: Sail Chen, Overland Park, KS (US); Matthew Pierce, Olathe, KS (US); Sofia Tan, Overland Park, KS (US); Alex Wang, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/215,099

(22) Filed: Aug. 22, 2011

(51) Int. Cl.
*H04W 4/00* (2009.01)
(52) U.S. Cl. .......... 455/422.1; 455/448; 455/456.3; 455/423; 705/347
(58) Field of Classification Search .......... 455/448, 455/456.3, 422.1, 423; 705/347
See application file for complete search history.

(56) References Cited

U.S. PATENT DOCUMENTS

| | | | |
|---|---|---|---|
| 7,072,639 B2 * | 7/2006 | Marsh et al. | 455/406 |
| 2010/0157823 A1 * | 6/2010 | Li et al. | 370/252 |
| 2011/0208668 A1 * | 8/2011 | Phillips | 705/347 |

* cited by examiner

*Primary Examiner* — Vladimir Magloire (57) ABSTRACT

A system for automatically generating a recommendation to migrate a wireless communication service account from a first wireless communication protocol to a second wireless communication protocol is provided. The system comprises a computer system, a data store comprising call metrics for a first plurality of base transceiver stations, wherein the base transceiver stations promote wireless communication according to the second wireless communication protocol, and an application stored in a memory of the computer system. The application identifies base transceiver stations associated with the first protocol most frequently used by the wireless account, identifies base transceiver stations associated with the second protocol that are proximate to the most frequently used base transceiver stations, and based on comparing call metrics between the two sets of base transceiver stations transmits a suggestion to migrate the wireless communication service account from the first wireless communication protocol to the second wireless communication protocol.

4 Claims, 4 Drawing Sheets

WIRELESS COMMUNICATION DATA STORE CONSTRUCTION AND ANALYSIS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication coverage has become nearly ubiquitous in the United States, and almost everyone carries a mobile communication device. Different individuals have different wireless communication needs. Some individuals may prefer devices that have large number keypads and that provide only voice communication capabilities. Other individuals may prefer devices that provide a touchscreen interface, that promote downloading applications, and that provide powerful data communication capabilities. Some individuals may use their devices in a work environment and desire physically robust devices that provide fast push-to-talk type voice communication capabilities.

SUMMARY

In an embodiment, a system for automatically generating a recommendation to migrate a wireless communication service account from a first wireless communication protocol to a second wireless communication protocol is disclosed. The system comprises a computer system, a data store comprising call metrics for a first plurality of base transceiver stations, wherein the base transceiver stations promote wireless communication according to the second wireless communication protocol, and an application stored in a memory of the computer system. When executed by the computer system, the application identifies a second plurality of base transceiver stations that are most frequently used for wireless communication based on the wireless communication service account, wherein the second plurality of base transceiver stations promote wireless communication according to the first wireless communication protocol, and identifies proximate base transceiver stations, wherein the proximate base transceiver stations are selected from the first plurality of base transceiver stations based on their proximity to the second plurality of base transceiver stations. The application also accesses the data store to retrieve call metrics associated with the proximate base transceiver stations and compares call metrics associated with the second plurality of base transceiver stations to the call metrics associated with the proximate base transceiver stations. Based on the comparison, the application further transmits a suggestion to migrate the wireless communication service account from the first wireless communication protocol to the second wireless communication protocol.

In an embodiment, a method of automatically generating a recommendation to migrate a wireless communication service account from a first model of handset to a second model of handset is disclosed. The method comprises automatically analyzing call metrics to identify a plurality of base transceiver stations (BTSs) most frequently used by the wireless communication service account and comparing by a computer a quality of service (QoS) experienced by the first model of handset when in the coverage area of the plurality of base stations to a quality of service experienced by the second model of handset when in the coverage area of the plurality of base stations. Based on comparing the experienced qualities of service, the method further comprises recommending that the wireless communication service account migrate to the second model of handset.

In an embodiment, a method of automatically generating a recommendation to migrate a first wireless communication service account from a first model of handset to a second model of handset is provided. The method comprises automatically analyzing a usage pattern of the first wireless communication service account of the first model of handset, automatically identifying other wireless communication service accounts that have migrated from the first model of handset to a different model of handset, wherein the second model of handset is one of the different models of handset and wherein the other wireless communication service accounts exhibit a usage pattern similar to the usage pattern of the first wireless communication service account, and determining the satisfaction experienced by each of the other wireless communication service accounts when migrating from the first model of handset. The method further comprises recommending that the first wireless communication service account migrate to the second model of handset based on the migration satisfaction experiences of the other wireless communication service accounts.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method is described for providing a recommendation for a wireless communication service subscriber to transition to using a different model of mobile device, for example a different model of mobile phone. A wireless communication service provider may wish to maintain a high level of customer satisfaction among its wireless communication service subscribers. Identifying one or more recommended models of device for the subscriber to migrate to can provide an opportunity to improve customer satisfaction and increase the probability that the subscriber will maintain their service with the service provider rather than switching to a different service provider. The wireless communication usage pattern of the user of the wireless account is determined by analyzing call detail records (CDRs). The usage pattern is compared to the functionality of the available models, and a sub-set of models that promote the subject communication usage is identified. Other factors may be used to further reduce the field of candidate models. For example, a trend of usage may be identified and used to reduce the field of candidate models.

In some embodiments, a quality of service experienced by the user of the wireless service is determined and compared to a quality of service that has been observed and/or can be predicted for candidate models if adopted by the user. The base transceiver stations most frequently used by the subscriber are identified. In an embodiment, a quality of service experienced by the incumbent device when served by the frequently used base transceiver stations is determined. A quality of service experienced by or predicted for candidate models when served by each of the same base transceiver stations or proximate base transceiver stations is determined. If one of the candidate models is determined to provide a better quality of service when using the subject base transceiver stations or proximate base transceiver stations, that model may be especially recommended to the subscriber. For example, a text message or other communication message may be transmitted to the subscriber suggesting they consider the recommended model when their contract period expires. The analysis and recommendation may be coordinated with the approach of the end of the subscriber's contract period.

The service provider may also wish to encourage subscribers using a mobile device that receives communication service from a first wireless communication network to migrate to using another mobile device that receives communication service from a second wireless communication network. For example, the service provider may want to decommission an out-of-date network to avoid spending money to maintain the network. Alternatively, the service provider may wish to migrate subscribers to a network that produces higher revenue. The subscriber may be identified as being a suitable candidate for migrating to the second wireless communication network based on their usage pattern or feature use profile. For example, the subscriber may be using a device that receives service from a network that provides a high performance push-to-talk feature, but the subscriber may not use the push-to-talk functionality. In this case, the subscriber may be suitable for migrating to a later generation network that does not emphasize a push-to-talk feature. The service provider may try to identify the top 25% of candidates for migrating to devices providing service via the second network, determine device recommendations for these top candidates, and send out the subject recommendations to these subscribers.

Figure 1:
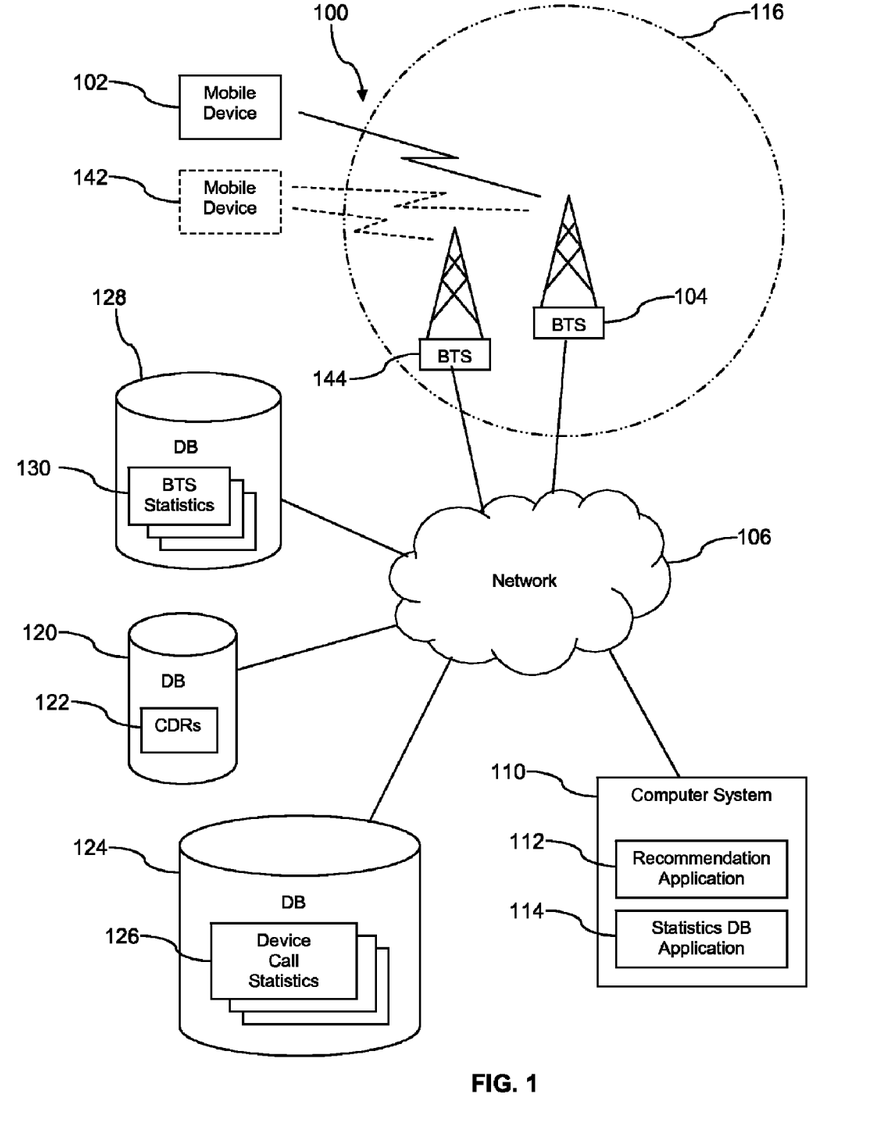
FIG. 1 is an illustration of a communication system according to an embodiment.

Turning now to FIG. 1, a communication system 100 is described. In an embodiment, the system 100 comprises a first mobile device 102 that is employed by a user for wireless communication. The first mobile device 102 may establish a wireless communication link with a first base transceiver station 104, and the first base transceiver station 104 may couple the first mobile device 102 to a network 106. In an embodiment, the first mobile device 102 and the first base transceiver station 104 communicate according to a first wireless protocol, for example using an integrated digital enhanced network (IDEN) wireless protocol, a code division multiple access (CDMA) wireless protocol, a global system for mobile communication (GSM) wireless protocol, a worldwide interoperability for microwave access (WiMAX) wireless protocol, a long-term evolution (LTE) wireless protocol, or another wireless protocol.

While the cloud representing the network 106 does not show details, some of the equipment comprising the network 106 may be dedicated to supporting communications according to one wireless protocol, and other equipment comprising the network 106 may be dedicated to supporting communications according to a different wireless protocol. For example, the first base transceiver station 104 may be used to provide a wireless communication link according to a first wireless protocol, while a second base transceiver station 144 may be used to provide a wireless communication link according to a second wireless protocol. The system 100 may comprise any number of base transceiver stations 104, 144. Further to this example, a first server computer and/or database (not shown) in the network 106 may be used to keep track of locations of the mobile devices 102 that are associated with the first wireless protocol, while a second server computer and/or database (not shown) may be used to keep track of locations of mobile devices 102 that are associated with the second wireless protocol. The locations of mobile devices 102 may be employed, for example, to route a voice call to the subject mobile device 102 through the base transceiver station 104 that currently provides wireless coverage to the subject mobile device 102, for example as the user of the mobile device 102 drives across town to attend a business meeting. Yet other equipment in the network 106 may be dedicated to providing communication service to a specific wireless protocol, for example voice mail servers, simple message service (SMS) servers, multi-media service (MMS) servers, etc.

In an embodiment, the first mobile device 102 is capable of communicating according to only the first wireless protocol. In other embodiments, however, the first mobile device 102 may be a multi-protocol device and may be capable of communicating according to a plurality of wireless protocols. While in the following discussions the mobile devices are described as being single protocol devices, the present disclosure may readily be adapted for use with multi-protocol mobile devices.

Over time subscribers typically change models of mobile device. For example, as technology advances, new features and capabilities are provided in later models of mobile devices. Wireless service providers may subsidize the purchase price of mobile devices and may place subscribers under a contract that provides for penalties if the subscriber terminates their service before the expiration of a time period of the contract. The wireless service provider may not subsidize the purchase of a different model of mobile device by the subscriber until the expiration of the time period of the contract. The time period of the contract may be determined based on a period of time needed to recover the up-front subsidy of the purchase price of the mobile device.

The wireless service provider may wish to migrate subscribers away from the first mobile device 102 that is associated with a first wireless protocol, for example when the provider is phasing out the first wireless protocol. For example, the provider may be phasing out an integrated digital enhanced network (IDEN) and concurrently building out a new network infrastructure to support a later generation wireless protocol such as long-term evolution (LTE). By migrating subscribers away from models of mobile device 102 supported by the IDEN network infrastructure to models of mobile device 102 supported by the LTE network infrastructure, the provider may reduce future investments in maintaining the IDEN network infrastructure while at the same time justifying future investments in building-out the LTE network infrastructure. At the same time, the provider desires to maintain customer satisfaction. Some subscribers may be identified as more suitable for migrating than other subscribers based on a variety of factors.

The system 100 further comprises a computer system 110 that executes a recommendation application 112 that generates recommendations for wireless communication service subscribers to change from the first mobile device 102 to a second mobile device 142, where the second mobile device 142 is a different model of device from the first mobile device. For example, the first mobile device 102 may be an IDEN model mobile phone, and the second mobile device 142 may be a LTE model mobile phone. As another example, the first mobile device 102 may be a model having an electro-mechanical keypad interface, and the second mobile device 142 may be a model having a touchscreen interface. The mobile devices 102, 142 may be any portable electronic device having a wireless communication capability, for example a mobile phone, a personal digital assistant (PDA), a media player, or other device.

The change by the subscriber from using the first mobile device 102 to the second mobile device 142 may be desirable because it improves the communication experience of the subscriber and/or because it promotes the business interest of the service provider. The recommendation application 112 may analyze a variety of information to identify a selected number of subscribers that are projected to be preferred candidates for changing from the first mobile device 102 to a different mobile device, for example a different model of handset, and to send a message to those subscribers identifying the different mobile device and possibly describing reasons for the subscriber to consider making the recommended change. The recommendation may identify a plurality of different mobile devices which are deemed likely to provide satisfaction to the individual subscriber and describe the relative merits of each of those different devices, for example based on the specific wireless communication service usage pattern of the individual subscriber. The application 112 may determine when a subscriber is approaching the end of a service contract, determine a recommendation to change to a different model of handset, and send the recommendation to the subscriber. This timing may promote retaining subscribers who might otherwise consider switching to a different mobile device supported by another service provider.

The recommendation may be transmitted to the subscriber via a simple message service (SMS) message, also referred to in some contexts as a "text message," via a multi-media message service (MMS) message, via a voice mail message, via an electronic mail message sent to an email address associated with the subscriber, or by another means. The message may include a link to a web page that is created for the specific subscriber that lists recommended models of mobile device in prioritized order, describes the features of the subject models that match the subscriber's needs, and provides further links to read further technical details about the models and/or to order the model. In an embodiment, the splash screen the subscriber sees when they log into their communication service account page on the service provider website may provide recommendations. In support of this embodiment, the service provider may send a voice message or other message to the subscriber, for example the recommendation application 112 may send a message to the mobile device 102, to suggest the subscriber log into their account page.

In an embodiment, the computer system 110 executes a statistics application 114 that accesses data about the wireless communication experience of the mobile devices 102, analyzes the data to determine call success statistics associated to individual mobile devices 102, and stores these device call statistics 126 in a first data store 124. It will be appreciated by one skilled in the art that the recommendation application 112 and the statistics application 114 may be combined in a single application or that these applications may be partitioned into three or more separate applications without deviating from the spirit of the present disclosure. The statistics application 114 may access a second data store 120 containing call detail records (CDRs) 122 associated with the individual mobile devices 102 and analyze the CDRs to determine a variety of statistical information for each of the mobile devices. For example, the statistics application 114 may identify the base transceiver stations 104 most frequently used by one of the mobile devices, the number of calls attempted by the mobile device, the number of call drops experienced by the mobile device, the number of blocked calls experienced by the mobile device, the number of successful calls of the mobile device, the number of calling minutes of the mobile device, and other call performance metrics of the mobile device. Alternatively, the number of call drops and the number of blocked calls may be aggregated into a single metric of number of call failures.

The device call statistics 126 may be partitioned by base transceiver stations 104 or may promote searching based on base transceiver station. Thus, the device statistics 126 associated with a particular mobile device 102 supports determining the number of calls attempted by the mobile device 102 through a first BTS, the number of calls attempted by the mobile device 102 through a second BTS, etc. Likewise, the device call statistics 126 associated with the particular mobile device 102 supports determining the number of successful calls, the number of dropped calls, the number of calling minutes of the particular mobile device 102 through the first BTS; determining the number of successful calls, the number of dropped calls, the number of calling minutes of the particular mobile device 102 through the second BTS; etc.

It is understood that an independent set of statistics may be developed for each mobile device 102. For example, a first set of statistics may be determined for the first mobile device 102 based on CDRs 122 associated with the first mobile device 102 and a second set of statistics may be determined for the second mobile device 142 based on the CDRs 122 associated with the second mobile device 142. Independent sets of statistics for each subject mobile device 102, 142 promote determining a more accurate recommendation of the second mobile device 142—for example a recommendation of migrating from a current device model to a different device model that will provide a better wireless communication experience to the subscriber. The device call statistics 126 may be collected by any method.

Base transceiver station statistics 130 may be collected for each base transceiver station 104, 144 and stored in a third data store 128. The base transceiver station statistics 130 may comprise statistics about call attempts, call successes, call drops, call blocks, call minutes, and other call statistics. These statistics may be partitioned by device models or searchable based on device model. For example, the call statistics of mobile phone model X when using a first BTS may be collected and stored independently of the call statistics of mobile phone model Y when using the first BTS; the call statistics of the mobile phone model X when using a second BTS may be collected and stored independently of the call statistics of mobile phone model Y when using the second BTS; and so on with the call statistics associated with other BTSs. The statistics application 114 may create the base transceiver station statistics 130, or alternatively the base transceiver station statistics 130 may be collected by a different application executing on the base transceiver station 104 and/or executing on a server computer in the network 106 and then updated to the base transceiver station statistics 130. It is understood that in an embodiment the data stores 120, 124, 128 may be combined in a variety of ways or may be implemented as additional data stores, for example the third data store 128 may be implemented as two or more data stores.

The recommendation application 112 may determine a wireless communication service usage pattern of the subscriber of the first mobile device 102. The usage pattern may characterize the subscriber's utilization of various communication services for example voice communication service, simple message system (SMS) service, multi-media system (MMS) service, email service, data usage, and other types of service usage. Alternatively, the usage pattern may be created by a different application executing on a different computer system in the service provider's enterprise, for example as part of establishing a subscriber profile to promote other services or to promote marketing purposes. The usage patter may also be referred to as a feature use profile in some contexts.

The recommendation application 112 may develop a device model recommendation for the subscriber based at least in part on the usage pattern. For example, the subscriber may use the first mobile device 102 exclusively for voice communication, and the recommendation application 112 may identify the second mobile device as a device that is simple and lacking smartphone features. As another example, the recommendation application 112 may develop a device model recommendation for the subscriber based in part on a usage trend, for example a consistently increasing number of voice call minutes each month for the last 8 months. The recommendation application 112 may, for example, associate increasing voice call minutes with a subscriber that is increasingly away from the office and hence potentially interested in more robust data services for the second mobile device 142.

The recommendation application 112 may determine, based on the usage pattern, that the subscriber does not use a feature that is better supported by the network infrastructure associated with the first mobile device 102 and recommend the second mobile device 142 that is associated with a different network infrastructure that supports the subject feature less fully. For example, the usage pattern may indicate that the subscriber does not use a push-to-talk feature that is very well supported by the DEN network infrastructure associated with the first mobile device 102 and recommend the second mobile device 142 that is associated with the LTE network infrastructure. The usage pattern may further include a frequency of experiencing roaming coverage, for example a frequency of the first mobile device 102 not receiving a wireless link from the first base transceiver station 104 operated by the service provider and instead receiving a wireless link from a base transceiver station operated by a different service provider, possibly incurring costly roaming fees for the subscriber.

In an embodiment, the recommendation application 112 may be executed to identify a subset of subscribers associated with a first network infrastructure as suitable candidates for migrating to a second network infrastructure, for example as part of a marketing initiative and/or as part of a long-term management strategy. For example, pursuant to a long-term management strategy to decommission an IDEN network infrastructure, management may be tasked with identifying 20% of existing IDEN subscribers for migrating to a mobile device model associated with a CDMA network infrastructure in the next quarter. The recommendation application 112 may be applied to identify 25% of the existing IDEN subscribers who are most likely to experience improved satisfaction by changing from their current IDEN mobile device to a different mobile device not associated with IDEN. It may be that some of these subscribers are selected based on their limited use of features strongly supported by IDEN. It may be that some of these subscribers happen to use their mobile device where they get poor wireless coverage from base transceiver stations 104 and would experience improved wireless coverage from base transceiver stations 144 associated with another wireless protocol. Because some of the subscribers may not act on the recommendation to migrate to a non-IDEN mobile device, more migration candidates may be identified than management was tasked with migrating.

In an embodiment, the recommendation application 112 analyzes the wireless coverage experienced by the first mobile device 102 based on a first wireless protocol and compares this to the wireless coverage experienced by devices based on a second wireless protocol. For example, a set of first base transceiver stations 104 associated with the first wireless protocol that the first mobile device 102 couples to is identified. A predetermined number of first base transceiver stations 104 most frequently used by the first mobile device 102 are identified, for example the 20 most frequently used base transceiver stations 104. It is understood, however, that the present disclosure contemplates using any number of most frequently used base transceiver stations—for example the 5 most frequently used base transceiver stations, the 10 most frequently used base transceiver stations, the 15 most frequently used base transceiver stations, the 25 most frequently used base transceiver stations, or another number.

The recommendation application 112 identifies the second base transceiver stations 144 associated with the second wireless protocol that are proximate to the most frequently used first base transceiver stations 104. For example first base transceiver station 104 and second base transceiver station 144 may be physically located in the same area 116. The area 116 may be restricted to a maximum size, for example to an area within one mile of the first base transceiver station 104 or within some other threshold distance of the first base transceiver station 104. The device call statistics 126 for the first mobile device 102 are read by the recommendation application 112, the base transceiver station statistics 130 of each of the second base transceiver stations 144 proximate to the most frequently used first base transceiver stations 104 are read by the recommendation application 112, and the quality of service provided to the first mobile device 102 by the most frequently used base transceiver stations 104 is compared, for each of the areas 116, to the quality of service provided by the second base transceiver stations 144 located proximate to the most frequently used first base transceiver stations 104. The comparison between the quality of service provided by the first base transceiver stations 104 to the first mobile device 102 with the quality of service provided by corresponding second base transceiver stations 144 may be used, at least in part, for recommending the second mobile device 142 to the subscriber.

It will be appreciated by one skilled in the art that a variety of ways of comparing quality of service among selected base transceiver stations 104, 144 are possible. Several ways will be described here, but it is understood that the present application is consistent with using other methods of comparing quality of service. Generally, different ways of comparing quality of service can be expected to provide increased forecasting accuracy in exchange for increased processing load. Increased processing load may involve either collecting more specific data to feed into the comparison algorithm and/or a more complicated comparison calculation formula. In combination with the present disclosure, one skilled in the art will readily be able to choose the appropriate balance of comparison complexity versus forecasting accuracy.

The expected improvement of quality of service of a subscriber migrating from a first wireless protocol to a second wireless protocol may be calculated as:

$$\Delta QoS = \frac{1}{\sum_{i=1}^{N} C_i} \sum_{i=1}^{N} [(Q2_i - Q1_i)C_i] \qquad \text{Eq 1}$$

where $\Delta QoS$ is the expected change in quality of service resulting from migrating from the first mobile device 102 to the second mobile device 144, N is the predefined number of most frequently used base transceiver stations 104, $Q1_i$ is the quality of service associated with the i-th most frequently used first base transceiver station 104, $Q2_i$ is the quality of service associated with the second base transceiver station 144 proximate to the i-th most frequently used first base transceiver station 104 (the second base transceiver station 144 in the area 116 of the i-th most frequently used first base transceiver station 104), and $C_i$ is a weighting factor associated with the i-th first base transceiver station 104.

If the value of $\Delta QoS$ is positive, the subscriber would be expected to experience a higher quality of service when migrating from the first mobile device 102 to the second mobile device 142; if the value of $\Delta QoS$ is negative, the subscriber would be expected to experience a lower quality of service when migrating from the first mobile device 102 to the second mobile device 142. A greater magnitude of $\Delta QoS$ would predict either greater improvement (if positive) or greater decrease (if negative) of quality of service when migrating from the first mobile device 102 to the second mobile device 142.

It will be appreciated that the value of $\Delta QoS$ depends on the base transceiver stations 104 most frequently used by the particular first mobile device 102. For example, the calculation of Eq 1 for a first subscriber living in a first area may yield a different result from the calculation of Eq 1 for a second subscriber living in a second area, even though the two subscribers may use the same model of first mobile device 102, simply because the two different subscribers are associated with different sets of most frequently used base transceiver stations.

Any of a variety of methods of determining Q1 and Q2 is consistent with the present disclosure. In an embodiment, the values of Q1 are specific to the particular first mobile device 102 associated with a particular subscriber. Alternatively, in an embodiment, the values of Q1 are the qualities of service provided by the subject first base station transceiver 104 across all devices of the same model as the first mobile device 102 associated with the particular subscriber. In another embodiment, however, the values of Q1 are the qualities of service provided by the subject first base transceiver station 104 across a plurality of devices, some of which may be a different model from the model of the first mobile device 102 associated with the particular subscriber. In an embodiment, the values of Q2 are the qualities of service provided by the subject second base transceiver station 144 across all devices, some of which may be a different model from the model of the second mobile device 142. Alternatively, in an embodiment, the values of Q2 are the qualities of service provided by the subject second base transceiver station 144 across all devices of the same model as the model of the second mobile device 142.

The quality of service of a base transceiver station 102, 144 may be defined in a variety of ways, any of which is consistent with the spirit of the present disclosure. The quality of service may be determined based on a number of attempted calls, a number of successful calls, a number of dropped calls, a number of blocked calls, and/or a number of refused calls (attempts to originate a call which are refused by the base transceiver station 104, 144 based on a temporary excess of on-going wireless links). For example, the quality of service may be determined as the ratio of successful calls to attempted calls. The quality of service may be determined based in part on channel quality indication (CQI) feedback provided by mobile devices 102, 142 to the base transceiver stations 104, 144.

The weighting factor $C_i$ may be determined by a variety of methods. In an embodiment, the weighting factor $C_i$ may be a constant value. For example, all $C_i$ may have a value of 1. Alternatively, the $C_i$ may have a range of different constant values, and the Q1 values may be ordered according to frequency of use. In an embodiment, the $C_i$ may be provided as a number of call attempts as in Eq 2 below:

$$\Delta QoS = \frac{1}{\sum_{i=1}^{N} A_i} \sum_{i=1}^{N} [(Q2_i - Q1_i)A_i] \qquad \text{Eq 2}$$

where $A_i$ is the number of calls attempted by the first mobile device 102 when in the coverage area of the i-th first base transceiver station 104. Alternatively, in an embodiment, the weighting factor $C_i$ may be the product of the number of calls attempts multiplied by a function of the number of dropped calls as in Eq 3 below:

$$\Delta QoS = \frac{1}{\sum_{i=1}^{N} A_i f(D_i)} \sum_{i=1}^{N} [(Q2_i - Q1_i)A_i f(D_i)] \qquad \text{Eq 3}$$

where the function f(D) is a function of the number of dropped calls and $D_i$ is the number of dropped calls the first mobile device 102 has experienced while coupled to the i-th first base transceiver station 104. While a variety of functions f(D) are contemplated by the present disclosure, in an embodiment, the value of f(D) has a minimum value of 1 when D is 0 and has an increasing value as the number of dropped calls D increases. The effect of f(D) is to ascribe greater weight to the quality of service comparison in areas 116 where the first mobile device 102 is experiencing greater numbers of dropped calls.

In an embodiment, the weighting factor $C_i$ may be an accumulated call time of the first mobile device 102 when in the coverage of the first base transceiver station 104 as in Eq 4 below:

$$\Delta QoS = \frac{1}{\sum_{i=1}^{N} T_i} \sum_{i=1}^{N} [(Q2_i - Q1_i)T_i] \qquad \text{Eq 4}$$

where $T_i$ is the accumulated time that the first mobile device 102 is engaged in calls when in the coverage area of the i-th first base transceiver station 104. The $C_i$ may be determined as $f(D_i)$ alone, as the product of $T_i$ with $f(D_i)$, or as the product of $A_i$ with $T_i$ and with $f(D_i)$. Alternatively, the $C_i$ may be determined as the sum of two or more of $A_i$, $T_i$, and $f(D_i)$. In an embodiment, the $C_i$ may be determined by yet other calculations.

The calculation of $\Delta QoS$ can be seen to be an average of QoS differences (where all C, have the same constant value) or as a weighted average of QoS differences. It is understood that the calculation of $\Delta QoS$ may be determined using data from selected corresponding windows of time, for example the most recent week of wireless service, the most recent month of service, the most recent year of service, or some other time window. In an embodiment, the $Q1_i$ and the $C_i$ may be based on data from a recent time window while the $Q2_i$ may be based on data collected over a different time window—for example a longer or shorter time window and/or a time window centered on a different time.

In an embodiment, the weighting factor $C_i$ may be used, at least in part, to take into account how close a used base transceiver station is to a proximate base transceiver station. For example, the $C_i$ in Eq. 1 above may be equal to $(3-d_i)/3$ for $0<d_i<3$, and 0 if $d_i \geq 3$, where di is the distance between the i-th most frequently used base transceiver station associated with the first wireless protocol and the base transceiver station of second wireless protocol that is proximate to the i-th most frequently used base transceiver station. Alternatively, two or more weighting factors may be combined. For example, the weighting factor for proximity of alternative base transceiver stations to the most frequently used base transceiver stations and the weighting factor for accumulated call time for the frequently used base transceiver stations may be combined together:

$$\Delta QoS = \frac{1}{\sum_{i=1}^{N} T_i R_i} \sum_{i=1}^{N} [(Q2_i - Q1_i) T_i R_i] \quad \text{Eq 5}$$

where $R_i$ is the distance between the i-th most frequently used base transceiver station associated with the first wireless protocol and the corresponding proximate base transceiver station associated with the second wireless protocol. Likewise, other weighting factors may be combined in determining the $\Delta QoS$.

In some cases there may not be a second base transceiver station 144 sufficiently close to the first base transceiver station 104. For example, the fifth first base transceiver station 104 among the N first base transceiver stations 104 most frequently used by the mobile device 102 may not be associated with a second base transceiver station 144 that is within the area 116. In an embodiment, $\Delta QoS$ may be calculated by dropping the term corresponding to the subject first base transceiver station 104, for example dropping the term corresponding to the fifth first base transceiver station 104. Alternatively, the term corresponding to the subject first base transceiver station 104 may have its weighting derated to take account of the possibility that comparison between the quality of service of the subject first base transceiver station 104 to the subject second base transceiver station 144 may not be meaningful to the subscriber's wireless communication service experience.

While the first base transceiver station 104 and the second base transceiver station 144 are represented in FIG. 1 as physically separate, in some cases the first base transceiver station 104 may comprise a first antenna array, the second base transceiver station 144 may comprise a second antenna array, and both the first antenna array and the second antenna array may be collocated on a common support structure, for example a tower. It may be desirable for the service provider to collocate antenna arrays associated with different wireless protocols as this may promote reduced costs for site construction and property easements or leasing. Likewise, in some circumstances, the electronics of the first base transceiver station 104 and the electronics of the second base transceiver station 144 may be collocated in the same equipment cabinet. Notwithstanding, the quality of service provided by the collocated equipment according to the first wireless protocol can be distinguished from the quality of service provided by the collocated equipment according to the second wireless protocol, and it is these distinguished qualities of service that may be compared to determine the value of $\Delta QoS$.

The methods and techniques described above may be adapted for use when a plurality of first mobile devices 102 are associated with a single subscription plan. For example, a family may have a single subscription plan that relates to several mobile devices 104. The several mobile devices 104 may each individually be under different contract dates or other restrictions on when a new model of mobile device 102 may be subsidized by the service provider. Additionally, a business may have a single subscription plan that relates to several mobile devices 102 used by its employees.

Figure 2:
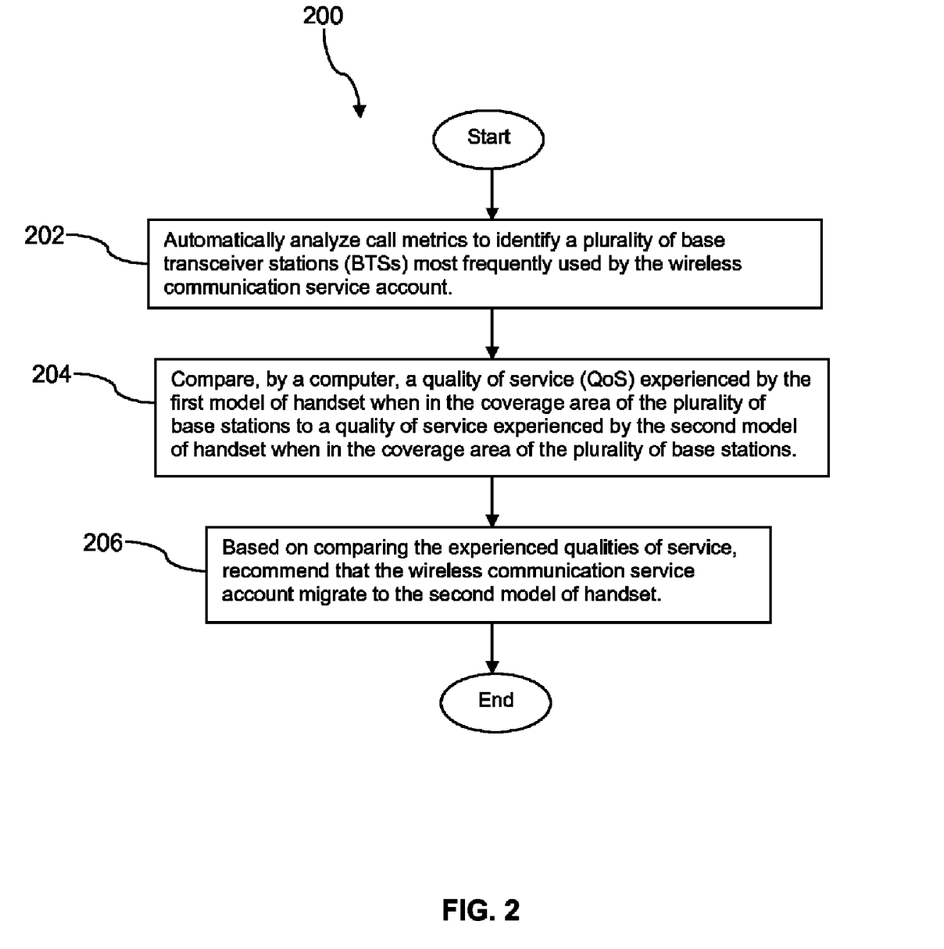
FIG. 2 is a flow chart illustrating a method according to an embodiment.

Turning now to FIG. 2, a method 200 is described. At block 202, call metrics are automatically analyzed to identify a plurality of base transceiver stations most frequently used by the wireless communications service account, for example the N base transceiver stations 104 most frequently used by the first mobile device 102. It is understood that N may be any number, for example 5, 10, 15, 20, 25, or another number. At block 204, a computer compares the quality of service experienced by the first model of handset when in the coverage area of the plurality of base stations to a quality of service experienced by the second model of handset when in the coverage area of the plurality of base stations. For example, the quality of service of the first mobile device 102 experienced in the coverage area of the N most frequently used first base transceiver stations 104 is compared with the quality of service associated with the second base stations 144 proximate to the N most frequently used base transceiver stations 104. Any method of comparing the quality of service between the base transceiver stations 104, 144 may be used, for example any of the methods of determining $\Delta QoS$ described above or another method. In an embodiment, the recommendation application 112 described above performs at least some of the processing of blocks 202 and 204. At block 206, based on comparing the experienced qualities of service, a recommendation that the wireless communication service account migrate to the second model of handset is generated. In an embodiment, the recommendation is transmitted to the first mobile device 102 via a text message or email message or voice mail message. Alternatively, in an embodiment, the recommendation is transmitted to the subscriber associated with the first mobile device 102 via an email address associated with the subscriber.

The processing of block 204 may be repeated for a plurality of different alternative models of handsets. For example, based on a usage pattern of the subscriber, a set of five candidate alternative models of handsets may be identified. Thereafter, the processing of block 204 is performed to compare each of the five candidate models to the first mobile device 102 in turn. One of the five candidate models may be selected as the recommended model—for example the second mobile device 142—based on realizing the highest expected improved quality of service.

Figure 3:
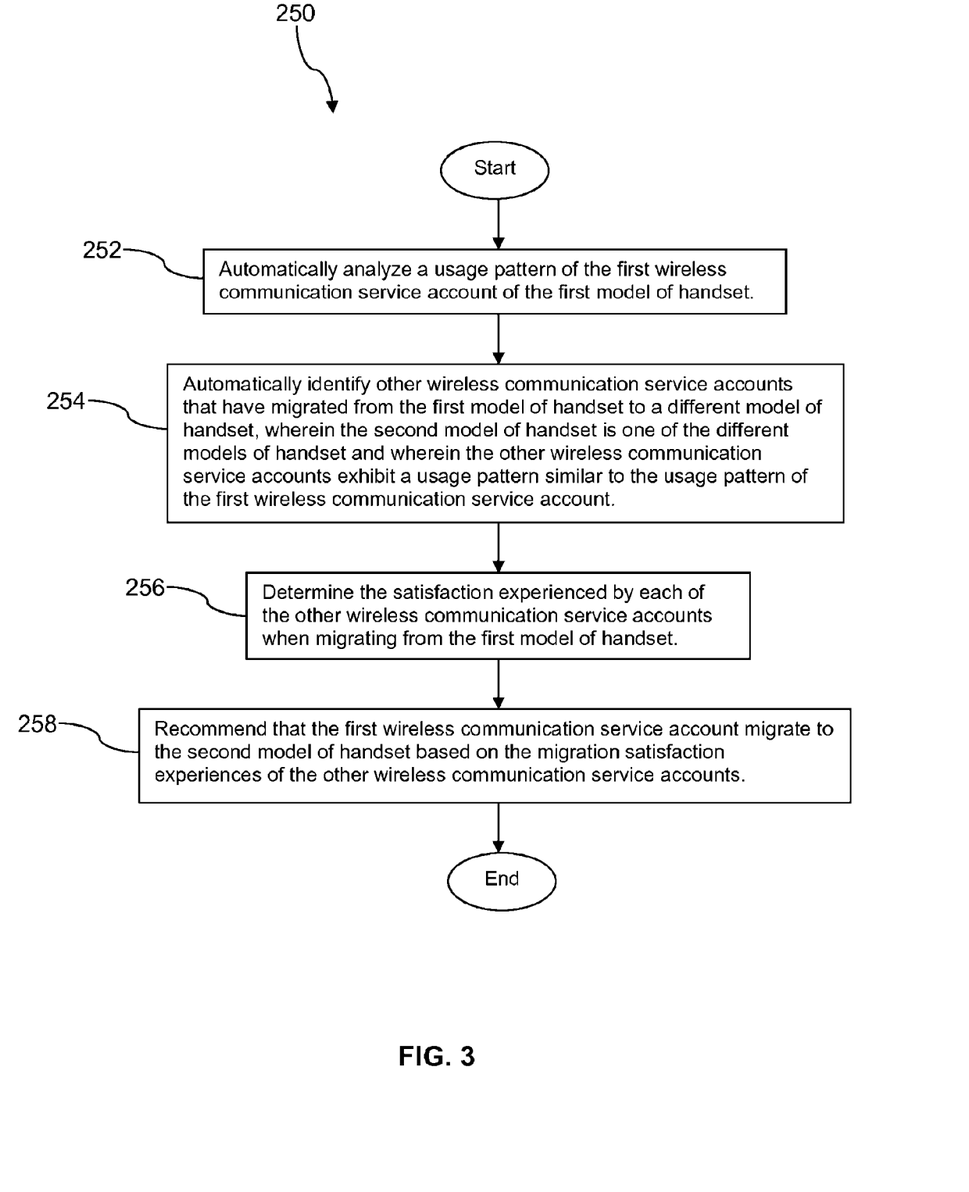
FIG. 3 is a flow chart illustrating a method according to an embodiment.

Turning now to FIG. 3, a method 250 is described. At block 252, a usage pattern of the first wireless communication service account of the first model of handset is automatically analyzed. At block 254, other wireless communication service accounts that have migrated from the first model of handset to a different model of handset are automatically identified, wherein the second model of handset is one of the different models of handset and wherein the other wireless communication service accounts exhibit a usage pattern similar to the usage pattern of the first wireless communication service account.

At block 256, the satisfaction experienced by each of the other wireless communication service accounts when migrating from the first model of handset is determined. For example, the recommendation application 112 may access statistics developed on satisfaction of like subscribers who migrated from the same first mobile device 104 to the subject second mobile device 142. The subscribers may be requested to fill out a brief feedback form after using their new mobile devices for a period of time, for example after one month, after six months, or after some other period of time. Alternatively, a quality of service metric may be calculated for a plurality of like subscribers who migrated from the first mobile device 102 to the second mobile device 142 in a manner similar to that described above for finding ΔQoS, for example substituting in actual results of the subject second mobile device 142 for the Q2 values. The satisfaction with the migration experience of the like subscribers may be determined based on the feedback statistics and/or based on the quality of service metrics.

The satisfaction of the subscribers migrating from the first mobile device 102 to the second mobile device 142 may be determined based in part on a statistical analysis of how many subscribers reject the second mobile device 142 and return to the first mobile device 102, or alternatively, based on a statistical analysis of how many subscribers initially migrate from the first wireless protocol to the second wireless protocol later migrate back to the first wireless protocol. The satisfaction of the subscribers migrating from the first mobile device 102 to the second mobile device 142 may be inferred based on a statistical analysis of the frequency of calls to a customer care center. The satisfaction of the subscribers may be determined based at least in part on the frequency of the subscriber replacing the second mobile device 142 with yet a different mode of mobile device within a threshold period of time after migrating to the second mobile device 142. The satisfaction of the subscribers may be determined based at least in part on the subscriber discontinuing a service account with the service provider after migrating to the second mobile device 142. The satisfaction of the subscribers migrating from the first mobile device 102 to the second mobile device 142 may be determined based on any combination of the above described methods and/or approaches.

At block 258, a recommendation that the first wireless communication service account migrate to the second model of handset is generated based on the migration satisfaction experiences of the other wireless communication service accounts. The recommendation may further be based on other considerations, for example based on a network coverage of a network infrastructure associated with the second mobile device 142.

Figure 4:
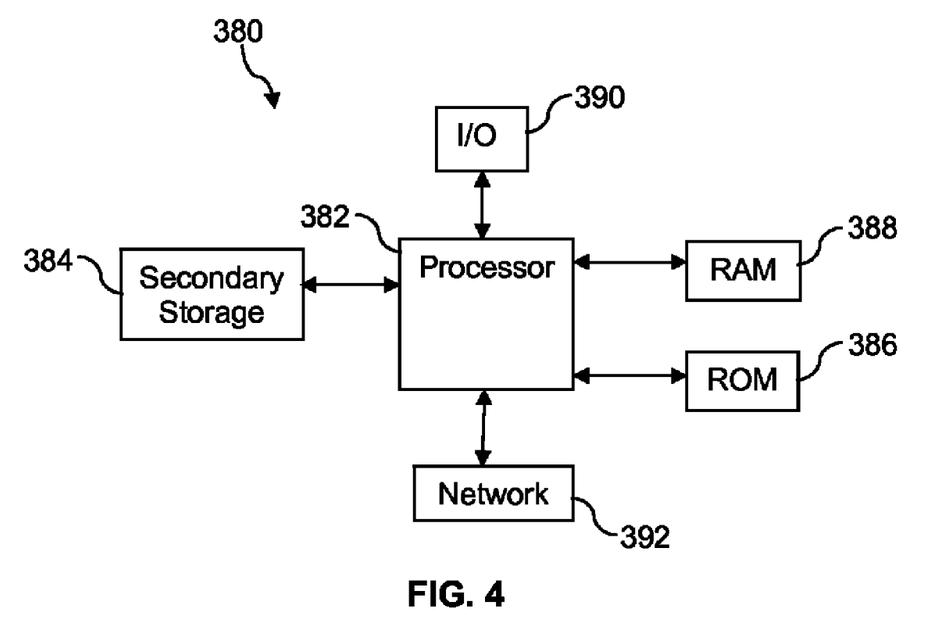
FIG. 4 is an illustration of an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for automatically generating a recommendation to migrate a wireless communication service account from a first wireless communication protocol to a second wireless communication protocol, comprising:
   a computer system;
   a data store comprising call metrics for a second plurality of base transceiver stations, wherein the base transceiver stations promote wireless communication according to the second wireless communication protocol;
   an application stored in a memory of the computer system that, when executed by the computer system,
      identifies a first plurality of base transceiver stations that are most frequently used for wireless communication based on the wireless communication service account, wherein the first plurality of base transceiver stations promote wireless communication according to the first wireless communication protocol;
      identifies proximate base transceiver stations, wherein the proximate base transceiver stations are selected from the second plurality of base transceiver stations based on their proximity to the first plurality of base transceiver stations, and wherein the proximate base transceiver stations are less than a threshold distance from one of the first plurality of base transceiver stations;
      accesses the data store to retrieve call metrics associated with the proximate base transceiver stations;
      compares call metrics associated with the first plurality of base transceiver stations to the call metrics associated with the proximate base transceiver stations, wherein the call metrics associated with the first plurality of base transceiver stations comprise a call success rate for each of the first plurality of base transceiver stations experienced by the wireless communication service account; and
      based on the comparison transmits a suggestion to migrate the wireless communication service account from the first wireless communication protocol to the second wireless communication protocol.

2. The system of claim 1, wherein the first plurality of base transceiver stations comprise 20 or fewer base transceiver stations.

3. The system of claim 1, wherein the call metrics associated with the first plurality of base transceiver stations further comprise a call success rate for each of the first plurality of base transceiver stations experienced by any wireless communication service accounts.

4. The system of claim 1, wherein the application compares call metrics based on at least one of call duration or numbers of calls.

* * * * *